May 31, 1949.　　　W. C. TROENDLE　　　2,471,985
STEERABLE INFANT'S CARRIAGE
Filed April 9, 1946　　　　　　　　　　　2 Sheets-Sheet 1

INVENTOR.
Wm. C. Troendle
BY
Chas. R. Fay, atty.

May 31, 1949.  W. C. TROENDLE  2,471,985
STEERABLE INFANT'S CARRIAGE
Filed April 9, 1946  2 Sheets-Sheet 2

INVENTOR.
Wm. C. Troendle
BY
Chas. R. Fay, atty.

Patented May 31, 1949

2,471,985

UNITED STATES PATENT OFFICE 2,471,985

STEERABLE INFANT'S CARRIAGE

William C. Troendle, Gardner, Mass., assignor to Thayer Company, Gardner, Mass., a corporation of Massachusetts Application April 9, 1946, Serial No. 660,749

1 Claim. (Cl. 280—48)

This invention relates to infant's carriages provided with special front wheel constructions for automatic steering of the front wheels in the desired direction.

Objects of the invention include the provision of a carriage of the class described comprising a spring frame consisting of a pair of spring rods having upturned ends, there being shackles on the ends supporting a carriage body, wheeled means securing the spring rods together and supporting the carriage at one end of the frame, and forwardly extending brackets secured to the spring rods at the opposite end, there being a pivoted lever on each bracket, said levers extending rearwardly and having means to insure swinging motion thereof in a horizontal plane only, each lever having a wheel axle thereon, and means to yieldingly maintain the levers and, therefore, the wheels in straight position with respect to the carriage, whereby the pivoted wheels will turn in the direction desired merely during the normal use of the carriage so that when the usual pusher handle is moved to the right, the pivoted wheels will swing to the left, and vice versa, so that the carriage is automatically steered.

Other objects and advantages of the invention will appear hereinafter.

Reference is to be had to the accompanying drawings, in which

Figure 1:
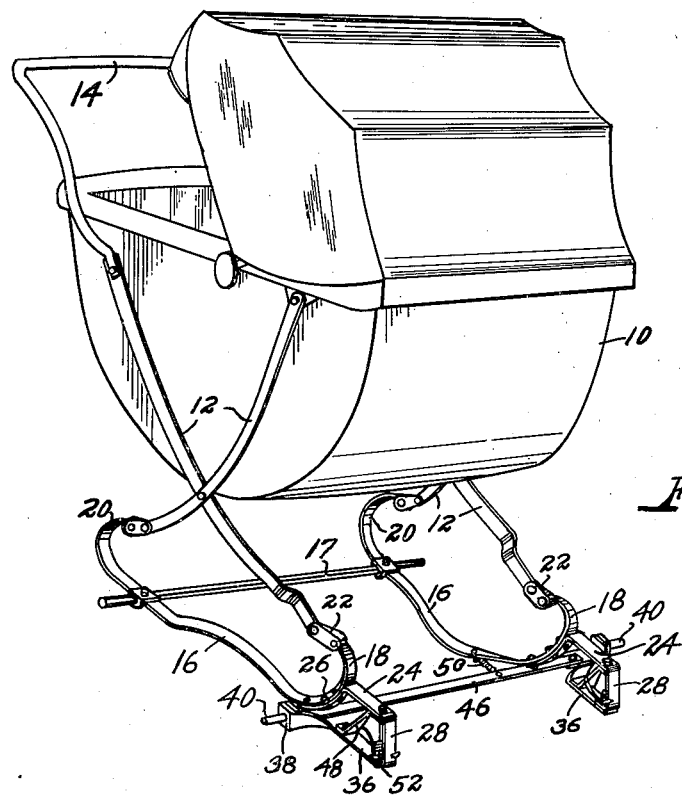
Figure 2:
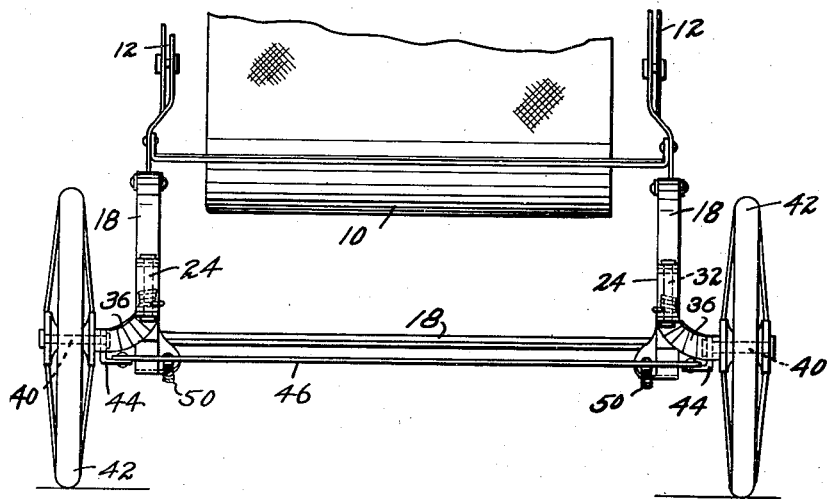
Figure 3:
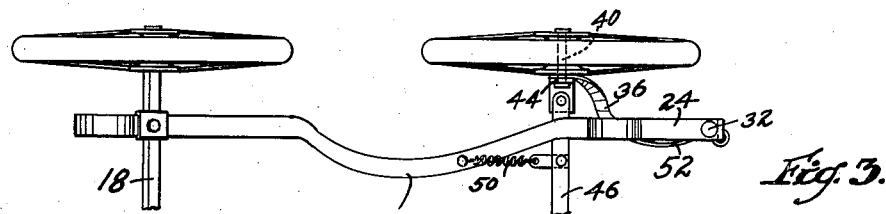
Figure 4:
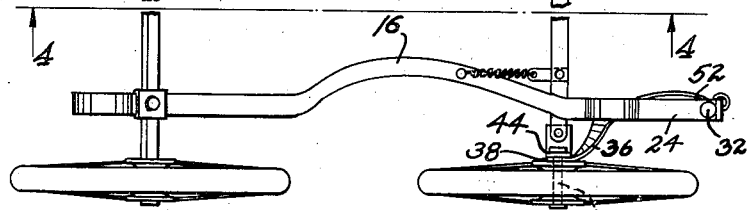
Figure 5:
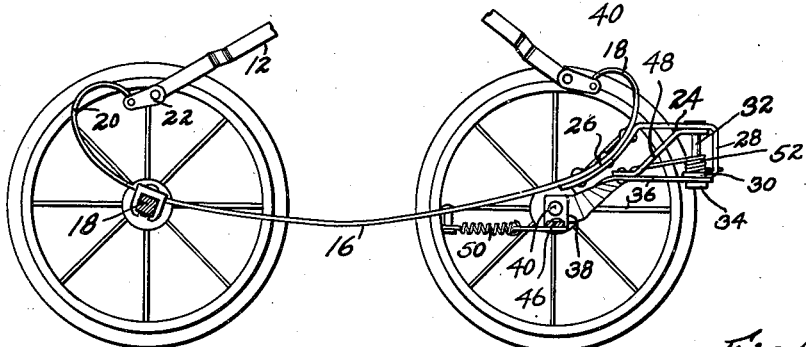

Fig. 1 is a view of a carriage in perspective showing the invention with the wheels removed, Fig. 2 is a view in front elevation of the carriage, parts being broken away, Fig. 3 is a top plan view of the carriage frame and supporting wheels, Fig. 4 is a view taken on line 4—4 in Fig. 3, and Fig. 5 is a view similar to Fig. 3 but showing the front wheels at an angle for a right hand turn.

As shown in Fig. 1 the invention may be applied to a conventional carriage 10 having a pair of supporting scissors frames 12 and a pusher handle 14.

A pair of spring rods 16 are mounted on a wheel rod 17, and the spring rods terminate in curved ends 18 and 20. The curved ends carry shackles 22 which serve to support the scissors frames 12.

The forward ends 18 of spring rods 16 have secured thereto brackets 24, along the curve of the ends 18 as shown at 26 so as to provide a rigid connection for the brackets. Each bracket is provided with a down-turned portion 28 and a reversely extending end 30, as may be seen in Fig. 4. The end 30 provides a mounting for a vertical pin 32, each pin 32 having a head 34 securing a lever 36 in position to swing on the lower surface of ends 30. These levers extend rearwardly to a position somewhat under the spring rods 16 and each lever is provided with a vertically disposed portion 38 carrying a wheel axle 40. Each wheel axle 40 is used to mount a wheel 42 and also to rivet an upstanding ear 44 on a cross rod 46 to the vertical portions 38. A brace 48 is rigidly secured to each lever 36 and is pivotally mounted on the pins 32 to swing with the levers and to maintain the same in horizontal position to prevent wobble of the levers as they turn. Braces 48 also solidly support the brackets 24 from the wheels 42 through the levers 36.

Springs 50 are secured to spring rods 16 and to the cross rod 46 for the purpose of tending to maintain the wheels straight, and coil springs 52 may be used if desired for the same purpose, these springs being coiled about pins 32 and having one end bearing on bracket 26 and the other end bearing on lever 36.

In the operation of the device, it will be clear that as the carriage is pushed forwardly by pusher handle 14, and it being desired to turn, for instance, to the right, the natural tendency is to move the pusher handle 14 to the left. This action is transmitted through the scissors frame to urge the front end of the carriage and the brackets 24 to the right and, since weight is applied to the front wheels 42, they will swing as shown in Fig. 5 to steer the carriage on an arc to the right. The opposite action takes place when the pusher handle 14 is urged to the right and in this case the wheels will swing to the left. Rod 46 insures that the wheels will swing in unison and spring rods 16 are curved inwardly, see Figs. 3 and 5, to accommodate the wheels as they swing.

An important feature of the present invention is the rigidity of the forward wheels and there is no looseness or wobble of the carriage because of the fact that wheels 42 support levers 36 which in turn support bracket 24 through the brace 48, pins 32, and portions 30 and 28 of the bracket. This construction provides a front end support for the carriage which is substantially as rigid as in prior art constructions which do not provide for swinging the wheels for steering.

Having thus described my invention and the advantages thereof, I do not wish to be limited to the details herein disclosed, but what I claim is:

A carriage of the class described comprising a spring frame, wheels supporting the frame in fixed relation thereto adjacent an end thereof, a pair of brackets rigidly fixed to the frame, a vertical pin in each bracket, a lever on each pin for swinging movement in a horizontal plane, a brace fast to each lever and swingable therewith, each brace closely engaging a horizontal surface of a bracket to rigidify the levers, so that the frame is supported by the levers and brackets, and a steerable wheel rotatably mounted on each lever.

WILLIAM C. TROENDLE.

REFERENCES CITED

The following references are of record in the file of this patent:

UNITED STATES PATENTS

| Number | Name | Date |
|---|---|---|
| 326,954 | Colby | Sept. 28, 1885 |
| 330,308 | Forrester | Nov. 10, 1885 |
| 669,418 | Lanciaux et al. | Mar. 5, 1901 |
| 1,036,117 | Holman | Aug. 20, 1912 |
| 1,100,713 | Colson | June 23, 1914 |
| 1,662,292 | Bender | Mar. 13, 1928 |
| 2,433,069 | Siebert | Dec. 23, 1947 |

FOREIGN PATENTS

| Number | Country | Date |
|---|---|---|
| 44,387 | France | Oct. 8, 1934 |